UNITED STATES PATENT OFFICE.

ERNST HUG, OF GRENZACH, GERMANY, ASSIGNOR TO THE HOFFMANN-LA ROCHE CHEMICAL WORKS, OF NEW YORK, N. Y., A CORPORATION OF NEW YORK.

POLYHYDROCOLCHICIN.

1,154,314. Specification of Letters Patent. Patented Sept. 21, 1915.

No Drawing. Application filed May 22, 1914. Serial No. 840,174.

*To all whom it may concern:*

Be it known that I, ERNST HUG, a citizen of Switzerland, and a resident of Grenzach, Baden, Germany, have invented certain new and useful Polyhydrocolchicin, of which the following is a specification.

The object of this invention is to convert colchicin into a hydrogenated product. Heretofore hydrogenated derivatives have been wholly unknown. I have now discovered, however, that colchicin, $C_{22}H_{25}NO_6$, can be readily hydrogenated with hydrogen in the presence of finely divided or colloidal palladium, or other metals of the platinum group. An analytical study of the product resulting from this process and the proportion of hydrogen found shows that the process results in the formation of tetrahydrocolchicin. The hydrogenated product is far less poisonous than the starting material and can therefore be employed therapeutically as a substitute for colchicin.

An example of the process is now given:

Four parts of amorphous colchicin are dissolved in 100 parts water and 100 parts alcohol; there is then added an aqueous solution containing 0.1 part of colloidal palladium. The liquid is freed from air and hydrogen is introduced into it, the liquid being maintained under slight pressure. Absorption begins at once and soon comes to an end. The alcohol is then driven off in vacuum and from the remaining aqueous solution the polyhydrocolchicin is extracted by means of chloroform. The solvent is then evaporated and the residuum dried in a vacuum. The resultant hydrogenated product is an amorphous, brittle, almost colorless mass which melts in the neighborhood of 100° C. An analysis of the product thus obtained showed the following results:

| Calculated for $C_{22}H_{29}NO_6$. | Found by analysis. | | | |
|---|---|---|---|---|
| | I. | II. | III. | IV. |
| C = 65.50% | 64.46% | | | |
| H = 7.25% | 7.24% | | | |
| N = 3.47% | | 3.61% | | |
| $OCH_3$ = 30.78% | | | 30.20% | 30.87% |

The tetrahydrocolchicin differs in a number of respects from the colchicin from which it is made and the following table has been prepared to show the behavior of the two bodies with a number of reagents.

| Reagent. | Colchicin. | Tetrahydrocolchicin. |
|---|---|---|
| Water | Cold, readily soluble. Hot, difficultly soluble. | Cold, rather difficultly soluble. Hot, difficultly soluble. |
| Alcohol | Very easily soluble | Very easily soluble. |
| Ether | Very difficultly soluble. | Fairly soluble. |
| Chloroform | Very easily soluble | Very easily soluble. |
| Benzol | Easily soluble. Ether precipitates much. | Readily soluble. Ether precipitates little. |
| Concentrated nitric acid. | Violet, then yellow | Violet, immediately colorless. |
| Concentrated sulfuric acid. | Yellow | Light brown, after 24 hours wine red. |
| Concentrated sulfuric acid and traces of nitric. | Green, blue, then violet and wine red. | Brown, then brown red. |
| Dilute and concentrated hydrochloric acid. | Yellow | Colorless. |
| Iron chlorid | Green when heated | Remains colorless even when heated. |
| Mercury chlorid and chloroform. | Yellow precipitate | White flocculent precipitate. |
| Platinum chlorid | No precipitate | No precipitate. |
| Picric acid | do | Weakly cloudy. |
| Mayer's reagent | do | No precipitate. |
| Mayer's reagent with hydrochloric acid. | Beautiful yellow precipitate. | White precipitate. |

While it cannot be definitely stated what rôle is played by palladium in the foregoing process, the action is apparently catalytic or in the nature of a catalytic action.

What I claim is:

1. Polyhydrocolchicin.

2. Polyhydrocolchicin being when dry an amorphous, brittle, almost colorless mass melting at approximately 100° C. and containing hydrogen approximating four atoms thereof in excess of the number of hydrogen atoms contained in colchicin.

In testimony whereof I have hereunto set my hand in the presence of two subscribing witnesses.

ERNST HUG.

Witnesses:
    CARIMIRO C. HANCO,
    ARNOLD ZUBER.